Nov. 27, 1934.   F. C. FRANK   1,981,953
WHEEL
Filed Oct. 23, 1929
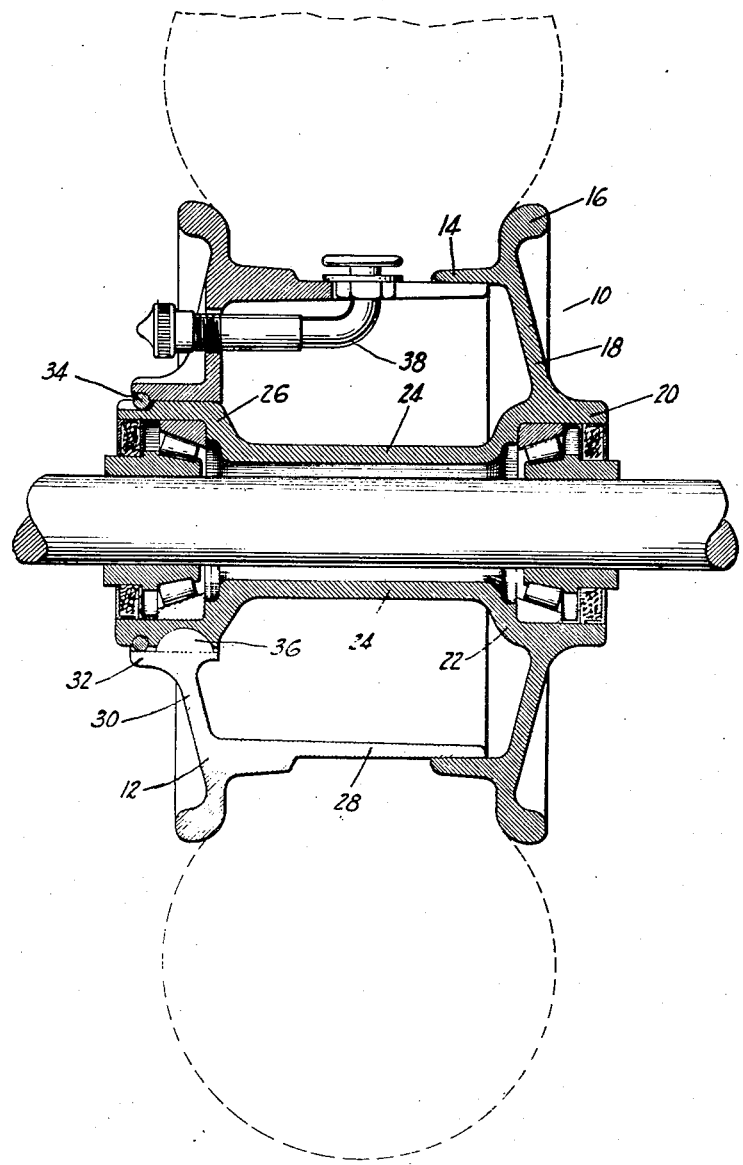
INVENTOR.
FREDERICK C. FRANK
BY
H. Q. Clayton
ATTORNEY Patented Nov. 27, 1934

1,981,953

UNITED STATES PATENT OFFICE 1,981,953

WHEEL

Frederick C. Frank, South Bend, Ind., assignor to Bendix Brake Company, South Bend, Ind., a corporation of Illinois Application October 28, 1929, Serial No. 402,877

2 Claims. (Cl. 301—63)

This invention relates to wheels and is illustrated as embodied in a light but strong wheel intended for use as a tail wheel on a very heavy aeroplane.

An object of the invention is to make the wheel as light and as strong as possible especially by adapting the structure for the use of duralumin. Preferably the wheel is made in two parts, each part comprising a disk body portion with hub and rim portions integrally secured thereto and which latter portions are adapted to telescope within one another. The hub portion of one of the aforementioned wheel parts extends throughout the entire width of the wheel, the hub portion of the other part being sleeved thereover.

According to one important feature of my invention, the two parts of the wheel are detachably secured together by a novel locking structure at the hub portions of the parts. I prefer to provide the wider of the hub parts with an annular groove in its outer end, which groove is adapted to receive a locking ring in abutting engagement with a shouldered portion on the outer hub part.

Other objects and features of the invention, including various novel and desirable particular constructions, will be apparent from the following description of an illustrated embodiment of the invention shown in the accompanying figure of the drawing disclosing a vertical section through my novel wheel.

In the preferred embodiment, as disclosed, there are provided wheel parts 10 and 12 preferably formed as castings of duralumin to render the wheel as light as possible for the purpose intended. Part 10 comprises a laterally extending rim flange 14 and a tire bead flange 16, which flanges at their junction are extended inwardly to provide an outwardly dished disk body portion 18 extended laterally outwardly at 20 and diagonally inwardly at 22 to provide a bearing housing, thence laterally across the wheel to provide the hub portion 24, thence diagonally outwardly and laterally to form the bearing receiving portion 26.

The remaining part 12 of the wheel is provided at its rim portion with a flange 28 which extends beneath the rim flange 14. The body portion 30 of the wheel part 12 is dished outwardly to correspond to the disk body part 18 and is thence flanged laterally at 32 to provide a hub portion sleeved over the hub portion 26 of the remaining wheel part. Hub part 26 is preferably provided at its edge with an annular groove to accommodate a locking ring 34, which ring fits within a rabbeted portion 35 in the outer hub portion 32. Hub portion 26 may further be provided with a key 36 adapted to fit within a keyway in the hub portion 32 to obviate relative rotation of the wheel parts. Rim portion 28 of the wheel part 12 is preferably slotted to accommodate the tire valve 38 which may be extended axially of the wheel and through an opening in the disk body part 30.

To effect the assembly, the tire with its deflated tube is positioned on the rim portion 28 of the wheel part 12, which is then moved axially to telescope within the wheel part 10 at its rim flange 14, the part 12 being moved laterally to a sufficient degree to expose the annular groove in the hub part 26. The locking ring 34 is then assembled in place and the tire inflated, the expansion of the same serving to move the wheel part 12 laterally into abutment with the locking ring. Relative lateral movement in one direction is thus obviated by the ring and relative circumferential movement is obviated by the key 36.

While one embodiment of my invention has been described in detail, it is not my intention to limit the scope of the invention to that particular embodiment or otherwise than by the terms of the appended claims.

I claim:

1. A wheel comprising a two-part rigid casting, one part including a hub having a radial flange on one end thereof supporting a relatively narrow rim portion for the reception of one bead of a tire on the outside, said flange having a radius less than the axial length of said hub, and another part including an annular member sleeved on the other end of the hub having a radial flange supporting a relatively wide rim portion for supporting the other bead of the tire and an inner tube carried in the tire, the wide rim portion being arranged to telescope and snugly fit within the narrow rim portion, and means for detachably securing the parts together with said wide rim portion partially underlying said narrow rim portion whereby said wheel is rigid of itself when assembled without internal stresses.

2. A wheel comprising a two-part rigid casting, one part including a hub having a radial flange on one end thereof supporting a relatively narrow rim portion for the reception of one bead of a tire on the outside, and another part including an annular member sleeved on the other end of the hub having a radial flange supporting a relatively wide rim portion for supporting the other tire bead and an inner tube carried in the tire, the wide rim portion being arranged to telescope and partially underlying and snugly fit radially within the narrow rim portion, and means for locking said parts in normal position, said means being removable only upon telescoping one part toward the other a short distance beyond the normal relative position of said parts.

FREDERICK C. FRANK.